United States Patent [19]

Diller

[11] Patent Number: 4,928,646
[45] Date of Patent: May 29, 1990

[54] COUPLING APPARATUS FOR A SPEED GOVERNOR

[75] Inventor: Friedhelm Diller, Rheda-Wiedenbruck, Fed. Rep. of Germany

[73] Assignee: Hella KG Hueck & Co., Lippstadt, Fed. Rep. of Germany

[21] Appl. No.: 358,264

[22] Filed: May 30, 1989

[30] Foreign Application Priority Data

May 30, 1988 [DE] Fed. Rep. of Germany ....... 3818310

[51] Int. Cl.$^5$ ...................... B60K 31/00; F02D 11/04; F02M 19/12
[52] U.S. Cl. .................................. 123/376; 123/342; 123/401; 180/175
[58] Field of Search ............... 123/342, 352, 360, 376, 123/363, 399, 400, 401; 180/175, 176, 177

[56] References Cited

U.S. PATENT DOCUMENTS

| | | | |
|---|---|---|---|
| 3,077,239 | 2/1963 | Simas | 180/174 |
| 3,157,244 | 11/1964 | McMurray et al. | 180/177 |
| 4,220,218 | 9/1980 | Riddel | 123/401 X |
| 4,355,611 | 10/1982 | Hasegawa | 123/401 X |
| 4,407,385 | 10/1983 | Hilton et al. | 180/175 |
| 4,798,258 | 1/1989 | Otteson | 180/175 |
| 4,834,044 | 5/1989 | Maas | 123/401 X |

FOREIGN PATENT DOCUMENTS

| | | | |
|---|---|---|---|
| 1081561 | 7/1980 | Canada | 180/175 |
| 2512138 | 10/1976 | Fed. Rep. of Germany | 180/175 |
| 7735209 | 5/1978 | Fed. Rep. of Germany | . |
| 7808547 | 8/1979 | Fed. Rep. of Germany | . |
| 3201071 | 7/1983 | Fed. Rep. of Germany | 123/401 |
| 3326460 | 2/1985 | Fed. Rep. of Germany | . |

Primary Examiner—Willis R. Wolfe
Attorney, Agent, or Firm—Griffin, Branigan & Butler

[57] ABSTRACT

A coupling apparatus for a speed regulator, or governor, of a typed used on motor vehicles for example, comprises a hollow connecting stud which is affixed to a governor positioning drive at a driven end telescoped to a hollow adjustment piece at a driving end. The hollow adjustment piece has a cap with an opening therein. A coupling rod passes through the opening having a driven end enlargement directed toward the governor positioning drive and a connecting apparatus at the other end connected to a speed adjusting apparatus. The coupling rod slides through the cap opening but the driven end enlargement is larger than that portion of the opening through which the coupling rod extends and can, therefore, not slide therein.

14 Claims, 4 Drawing Sheets

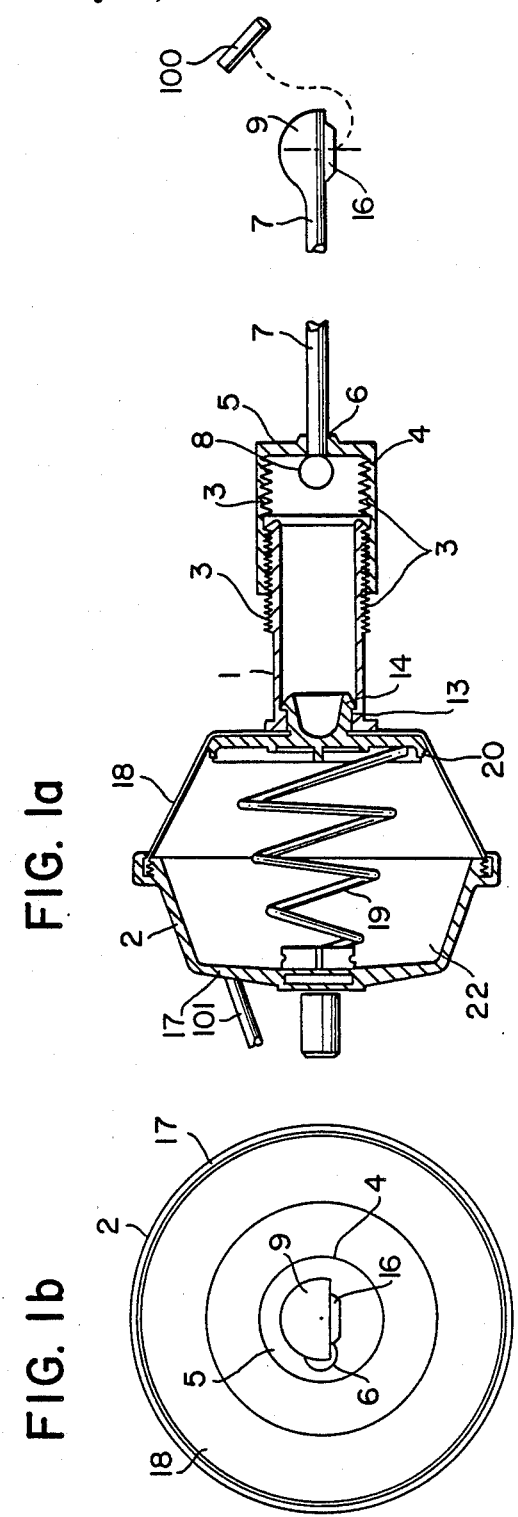

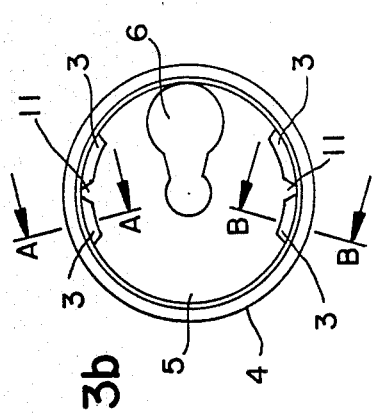
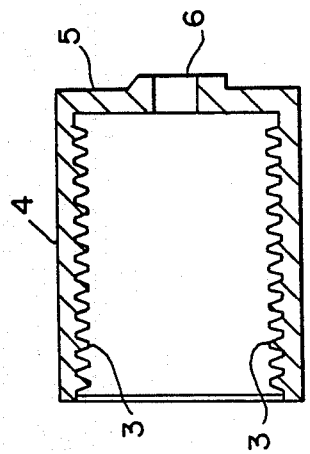
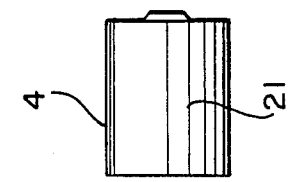
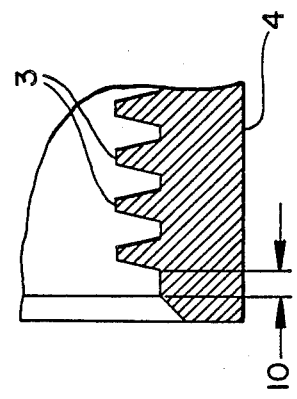
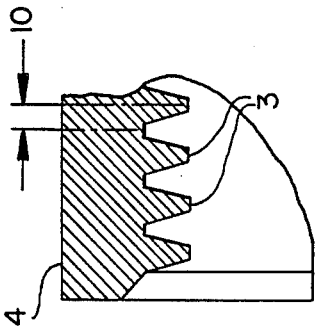

COUPLING APPARATUS FOR A SPEED GOVERNOR

BACKGROUND OF THE INVENTION

This invention relates to a coupling apparatus for a speed regulator, or governor, particularly of a type used in motor vehicles. The invention relates even more particularly to such a coupling apparatus having parts which move with respect to one another but which can be selectively affixed to one another so that a governor positioning drive is effectively linked to a speed adjusting apparatus for controlling, directly or indirectly a motor throttle.

A coupling apparatus of the type of this invention is disclosed in German Gebrauchsmuster No. GM 77 35 209. The coupling apparatus, which is between a speed adjustment apparatus for controlling the operation of an internal combustion engine and a governor positioning drive, comprises two parts which are moveable relative to one another and a third, or fastening, part, which connects the first two parts together. The fastening part includes a latch mounted on one of the first two parts which is driven by an electromagnet to engage a depression in the other part. The first part is cylindrically shaped and can be coupled directly to a gas-pedal lever. The second part is a piston that is slidable inside a cylindrical bore of the first part. The latch is mounted on the outer surface of the cylinder of the first part and the depression is in the piston of the second part. The piston is connected via a toothed rod with a positioning motor. When the governor is not being used the speed adjustment apparatus should be decoupled from the governor positioning drive. Should the governor be activated, the latch is driven by the electromagnet through an opening in the cylinder of the first part into the surface of the piston. The governor positioning drive moves the piston out of a neutral position so long as the latch is pressing into the depression of the piston, and this is controlled by a switch. Thus, the driving speed is controlled by the governor. If the governor is turned off by means of the switch, the bolt is lifted out of the depression by a return spring once the electromagnet is deenergized so that the vehicle speed is once again determined by a driver. It is disadvantageous to employ a latch that is driven by an electromagnet and returned by a spring inasmuch as such an arrangement is not simple and is not inexpensive. Also, one must have a switch which shows the position of the latch. Also, it is disadvantageous that the latch presses on an outer surface of the piston when the governor is activated and then rides along the piston until it falls into the depression, which involves a delay in operation of the governor and tends to create undue wear on the parts. Still further, it is disadvantageous that when a driver wishes to accelerate he must first overcome the resistance of the latch in order to decouple the first and second parts.

German Gebrauchsmuster No. GM 78 08 547 discloses a coupling assembly which has a pneumatic positioning element at one end of a coupling rod whose movement is transmitted over the coupling rod. A coupling apparatus, at an opposite end of the coupling rod, is coupled to the coupling rod via an adjustment apparatus. The coupling apparatus in this case is a ball socket. A disadvantage of this arrangement is that decoupling of the positioning element from the speed adjusting apparatus, which is coupled to the coupling apparatus, is not provided so that every movement of the positioning element is passed on to the speed adjustment apparatus. Thus, the force needed to move the speed adjustment apparatus is increased as is the wear and tear on the speed adjustment apparatus. Also, it is disadvantageous that with this arrangement the adjustment apparatus comprises a threaded shaft with a nut with which a fine, exact, and quick adjustment of the coupling apparatus to a basic position of the speed adjustment apparatus is only possible with difficulty, since tightening the nut creates a force in the speed adjusting apparatus.

It is an object of this invention to provide a coupling apparatus which is uncomplicated and inexpensive to both produce and mount. It is also an object of this invention to provide a coupling apparatus which works well with most speed adjustment apparatus. Further, it is an object of this invention to provide a coupling apparatus for a speed governor in which a governor positioning drive can be decoupled from a speed adjusting apparatus without application of additional force to manually move the speed adjustment apparatus.

SUMMARY

According to principles of this invention, a cylindrically shaped hollow connecting stud is affixed to a governor positioning drive at a driven end thereof and to an adjustment apparatus at a driving end thereof. The adjustment apparatus comprises a cylindrical hollow adjustment piece which telescopes with the cylindrical hollow connecting stud and which has an adjustment-piece cap thereon. The adjustment piece cap has an opening therethrough. A coupling rod extends slidabley through a portion of the opening and has an enlargement at a driven end thereof which has lateral dimensions greater than dimensions of the portion of the opening through which the coupling rod extends. A driving end of the coupling rod has a connecting apparatus which connects the coupling rod with a speed adjustment apparatus.

BRIEF DESCRIPTION OF THE DRAWINGs

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1a is a partial cross section of a coupling apparatus for a speed governor of this invention;

FIG. 1b is a front end view of the coupling apparatus of FIG. 1a;

FIG. 2b is an end view of the hollow connecting stud of FIG. 2a taken from the right as viewed in FIG. 2a;

FIG. 2c is an enlarged view of detail Y shown in FIG. 2a;

FIG. 2d is an enlarged view of detail Z of FIG. 2a;

FIG. 3a is a cross sectional side view of a cylindrically shaped hollow adjustment piece of FIG. 1a;

FIG. 3b is an end view of the hollow adjustment piece of FIG. 3a taken from the left as viewed in FIG. 3a;

FIG. 3c is an enlarged cross sectional view taken on line A—A in FIG. 3b;

FIG. 3d is an enlarged cross sectional view taken on line B—B of FIG. 3b;

FIG. 3e is a side view of the hollow adjustment piece of FIG. 3a, but not in cross section;

FIG. 4a is a bottom view of a coupling rod of the coupling apparatus of FIG. 1a;

FIG. 4b, is a side view of the coupling rod of the coupling apparatus of FIG. 1a.

DESCRIPTION OF THE PREFERRED EMBODIMENT

Figure 2A:
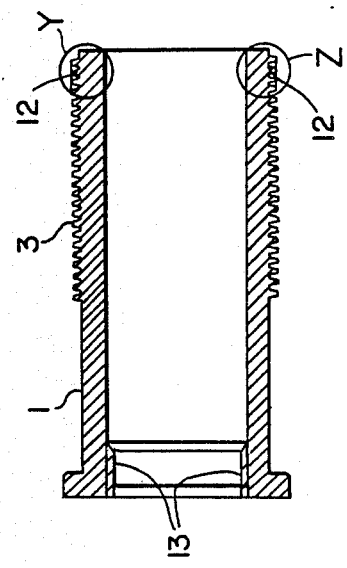
FIG. 2a is a cross sectional view of a cylindrically-shaped hollow connecting stud of the coupling apparatus of FIG. 1.

FIG. 1a shows a side, partial cross section, of a coupling apparatus for a speed governor according to principles of this invention having a governor positioning drive 2 which is coupled to a speed adjustment apparatus, represented as a gas pedal 100 in FIG. 1a. The speed adjustment apparatus (gas pedal 100) is directly or indirectly coupled to a throttle (not shown). FIG. 1b shows a front end view of the inventive coupling apparatus.

The governor positioning drive 2, in order to reduce cost and simplify production is a pneumatic motor that is affixed to a vehicle chassis 101 or to a motor block. The pneumatic motor comprises a main body 17 which is preferably injection molded of a resinous plastic, a membrane 18 which is affixed about a perimeter thereof to the main body 17, and an injection molded plate 20 which is mounted at an opening in the membrane to close and seal the membrane. A spring 19 is positioned between the main body 17 and the plate 20 to provide a neutral or idle position setting of the governor positioning drive 2. When the governor is turned off, the spring 19 places the governor positioning drive 2 back to its normal, base, attitude. The main body 17 has an opening therein through which a pressure chamber 22 of the governor positioning drive 2 communicates with a source of negative pressure whose magnitude is controlled by a speed governor.

In a nonillustrated embodiment of the invention, the governor positioning drive 2 is an electrical motor rather than pneumatic.

The plate 20 has a fastening part 14 on its side directed away from the main body 17. The fastening part 14 is radially resilient such that it can be compressed radially inwardly to be then biased radially outwardly.

A cylindrical, hollow connecting stud 1, as is shown in FIG. 2, has on an inner surface of a driven end a cross sectional restriction 13 which meshes with the fastening shoulder 14 of the plate 20. The dimensions of this fastening arrangement are such that when the fastening shoulder 14 is inserted through the restriction 13 of the hollow connecting stud 1 the membrane is pinched between the plate 20 and the hollow connecting stud 1 to provide a seal from atmosphere for the pressure chamber 22. The hollow connecting stud 1, as can be seen in FIGS. 2a and 2b has at a driving end, opposite to the governor positioning drive 2 end, on its outer surface, two groups of radially-outwardly extending, resilient, sawtooth type, ribs 3, the two groups of ribs being positioned 180° to one another to extend away from one another. The ribs of the two groups run circumferential but are arranged to form groups parallel to one another and to an axial direction, the hollow connecting stud 1 being circular in the preferred embodiment. A cylindrical hollow adjustment piece 4 is telescoped onto the driving end of the hollow connecting stud, this element being shown in more detail in FIGS. 3a and 3b. The hollow adjustment piece 4 has two oppositely positioned groups of radially-inwardly directed, resilient, sawtooth type ribs arranged along the entire length of its inner surface in order to provide the greatest possible adjusting area. The radially-inwardly directed ribs of the groups are arranged in groups extending in the axial direction parallel to each other.

The axial distance between ribs of the hollow connecting stud 1 and the hollow adjustment piece 4 are approximately the same so that they can mesh with one another.

The groups of ribs are arranged such that the hollow adjustment piece 4 can be freely moved on the hollow connecting stud 1 in the axial direction so that a simple, inexpensive, and quick length adjustment of the coupling apparatus to an idling position of a throttle can be made.

Figure 2E:
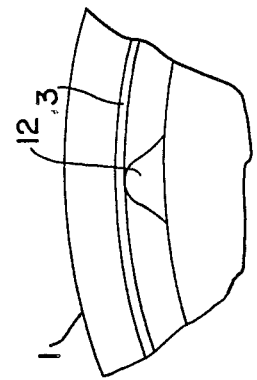
FIG. 2e is an enlarged view of detail X of FIG. 2b.
Figure 2D:
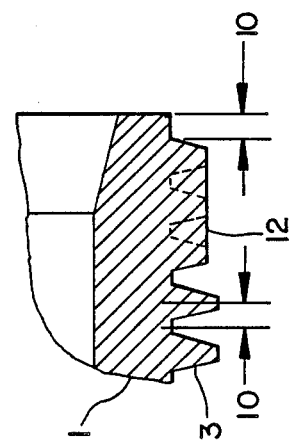
Figure 2B:
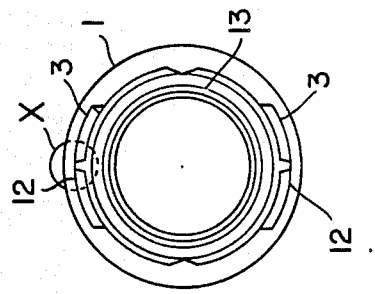
Figure 2C:
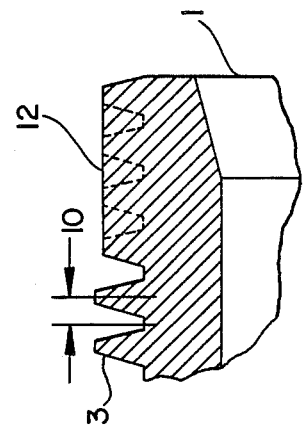

When adjusting the position of the hollow adjustment piece 4 axially on the hollow connecting stud 1, with the speed adjustment apparatus (gas pedal) 100 being effectively coupled via the coupling apparatus with the governor positioning drive 2, to an idling position of the throttle, a relative rotation of the hollow adjustment piece on the hollow connecting stud 1 causes the ribs 3 and 3a to mesh with or disengage from one another. In order to achieve a finer adjustment the oppositely positioned ribs 3 of the hollow adjustment piece 4 are respectively displaced from one another a distance 10 which here is approximately half of the spacing between adjacent ribs, as is shown in the enlarged cross sections A—A and B—B of FIGS. 3c and 3d. Also, the ribs 3 of the hollow connecting stub 1 which extend away from one another are also displaced a distance from one another which is approximately half of the spacing between adjacent ribs in the axial direction as can be seen in FIGS. 2c and 2d. If such a fine adjustment is not necessary, with this arrangement the spacing between adjacent ribs can be enlarged, which makes manufacturing easier and decreases cost, without decreasing adjustment exactness.

In order to stabilize the adjusting mechanism in one axial position and to protect against an unintentional relative rotation between the hollow connecting stud 1 and the hollow adjusting piece 4 in which the ribs 3 of the hollow adjustment piece 4 and the hollow connecting stud 1 come unmeshed, the ribs 3 of the rib groups of hollow adjustment piece 4 define grooves, or notches, 11 extending parallel to the axial direction, which are illustrated in FIG. 3b. Also, the first ribs 3 of the hollow connecting stud 1 comprise ridges, or humps, 12, each of which are, in a preferred embodiment, lower than the ribs 3 and has a width which is approximately the same as the width of the groove 11. A ridge 12 can be resiliently forced in a groove 11 and insures therewith that the hollow adjustment piece 4 is not inadvertently rotated. The form of the ridges 12 is shown in FIGS. 2a and 2b. The enlarged detail X in FIG. 2e shows the ridge 12 in a front end view. The details Y and Z of FIGS. 2c and 2d show an enlarged side view of the ridge in section. The ridge extends in this case, for example, over the first three to four ribs 3. The number of ribs 3 over which the ridge 12 extends determines the engagement strength between the hollow connecting stud and the hollow adjustment piece 4. The engagement strength is also determined by the height 12 which can be smaller, the same or larger than the height of the ribs 3. In this regard, the resinous plastic of which the hollow connecting stud 1 and the hollow adjusting piece is somewhat resilient such that the ridge 12 can be snapped over the ribs 3 of hollow adjustment piece into and out of the groove 11. The resiliency of the material and the thickness of the ribs is also a factor in determining the engagement strength.

In another embodiment, the groove 11 can be on the hollow connecting stud 1 and the ridge 12 can be on the hollow adjustment piece 4. The ribs can also have any number of grooves or ridges.

FIG. 3e shows the inventive hollow adjustment piece 4 in smaller proportions. In order to simplify adjustment of the hollow adjustment piece, its peripheral outer surface has small rills extending parallel to the axial direction to aid in gripping this outer surface for rotating the hollow adjustment piece 4.

As can be seen in FIGS. 1a and 3a, the hollow adjustment piece 4 has an adjustment-piece cap 5 at its driving end (the opposite end from the governor positioning drive 2). In this case, in order to provide uncomplicated and economical production, the adjustment-piece cap is molded as one piece with the hollow adjustment piece 4.

The adjustment-piece cap 5 defines an opening 6 to slidably receive a coupling rod 7.

Figure 4C:
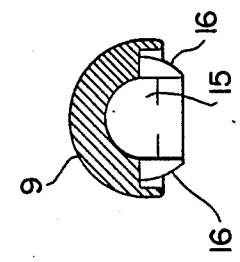
FIG. 4c is a cross sectional view taken on line C—C in FIG. 4b.
Figure 4A:
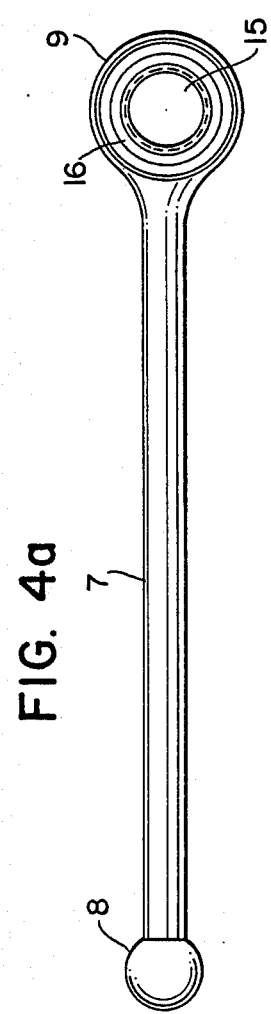
Figure 4B:
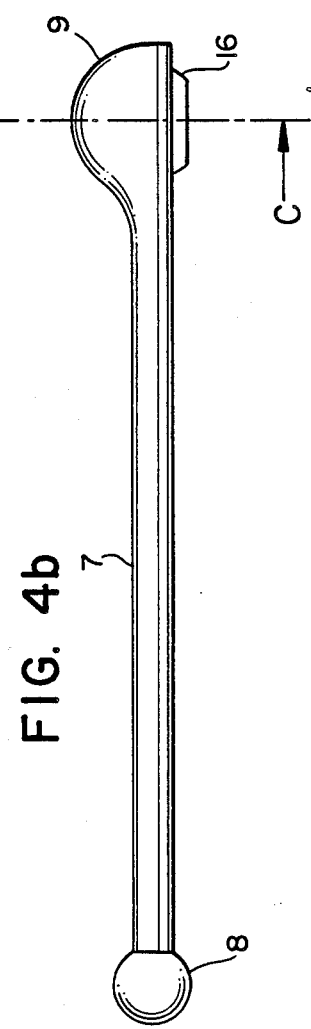

FIGS. 4a and 4b show the coupling rod 7 in various views.

The coupling rod 7 has an enlargement 8 at its driven end (the end directed toward the governor position drive 2) which is formed as one piece with the coupling rod 7. The enlargement 8 is constructed as a spherical head, for example. At the driving end of the coupling rod 7 a connecting apparatus 9 is provided for an economical and uncomplicated attachment thereof with the speed adjustment apparatus 100. In order to provide uncomplicated mounting, the connecting apparatus 9 is in the form of a ball socket 15 and here, for example, comprises an elastic spring snap 16 to receive a spherical head. In another embodiment the ball socket 15 has a plurality of spring snaps 16.

FIG. 4c shows in section on line C—C of FIG. 4b the ball socket 15 and the spring snap 16.

FIG. 3b shows the shape of the opening 6 in the adjustment-piece cap 5 of the hollow adjustment piece 4 through which the coupling rod 7 slidably extends. The opening 6 has a partially round first section whose cross section is larger than the cross section of the enlargement 8 of the coupling rod 7 so that the coupling rod 7 can be inserted through the opening 6 of the adjustment-piece cap 5 in the direction of the governor positioning drive 2.

The opening 6 has a second, tapered, portion that tapers to be smaller than the cross section of the coupling rod 7 and serves as a clip through which the coupling rod 7 can be forced. The third portion of the opening 6 is approximately in the center of the adjustment-piece cap 5 of the hollow adjustment piece 4 for slidably receiving the coupling rod 7.

The governor positioning drive 2 of the governor is thus always coupled with the speed adjustment apparatus 100 when the enlargement 8 of the coupling rod 7 engages the adjustment-piece cap 5 of the hollow adjustment piece 4 at the opening 6.

In operation, when the coupling apparatus is mounted, the governor positioning drive 2, which is affixed to the hollow connecting stud 1, is mounted on a portion of a vehicle chassis or motor block. The coupling rod 7 is extended through the opening 6 of the adjustment-piece cap 5 of the hollow adjustment piece 4 and snapped into the center thereof. The hollow adjustment piece 4 is shoved onto the hollow connecting stud 1 and the coupling rod 7 is attached to the speed adjustment apparatus 100 through the connecting apparatus 9. The adjusting mechanism should be set to be spring biased to the idle position of a throttle for the speed adjustment apparatus 100. In order to adjust the coupling apparatus of this invention to this position, the hollow adjustment piece 4 is moved axially on the hollow connecting stud 1 until the enlargement 8 of the coupling rod 7 engages the adjustment-piece cap 5 of the hollow adjustment piece 4. At this point, the hollow adjustment piece 4 is rotated relative to the hollow connecting stud 1 so that the ribs 3 mesh with one another and the ridge 12 snaps in the groove 11. In this simple manner, the length of the coupling apparatus can be adapted to fit various situations as is provided by tolerances of the adjusting mechanism.

When the governor is not in operation movement of the speed adjustment apparatus, that is the gas pedal 100, causes free movement of the coupling rod 7 in cavities of the hollow connecting stud 1 and the hollow adjustment piece 4 without transmission of force to the governor positioning drive 2.

If the governor is placed in operation, a negative pressure corresponding to a regulated speed is transmitted to the pressure chamber 22 of the governor positioning drive 2 which pulls the coupling rod 7 in the direction of the governor positioning drive 2. The coupling rod 7 is restrained from moving away from a neutral position by a spring of the speed adjustment apparatus (gas pedal) 100 so that the enlargement 8 remains at all times in engagement with the hollow adjustment piece 4. Thus, the governor position drive 2 positions the hollow connecting stud 1 which, in turn, positions the coupling rod 7 and the gas pedal 100.

When it is necessary to further accelerate the vehicle manually, the coupling rod 7 is free to slide in the opening 6 without the governor positioning drive 2 being driven.

When the governor is turned off, the governor positioning drive 2, by means of force from the spring 19, returns to its normal, idle, position and the speed is again, throughout its spectrum, determined by movement of the speed adjustment apparatus (gas pedal 100).

In order to provide an uncomplicated and economical production of the coupling rod 7, the hollow adjustment piece 4 and the hollow connecting stud 1, these pieces are each injection molded as one piece, including the ribs thereof, from resinous plastic. However, these pieces can also be made of other materials such as metal. The connecting apparatus 9 can, in other embodiments, be directly or indirectly linked to a throttle.

A benefit of this invention is provided by the hollow connecting stud 1 which is affixed to the governor positioning drive 2 because such a mechanism provides a certain positioning movement from the governor positioning drive to the coupling apparatus which, because of its cylindrical, hollow, shape allows a further part of the coupling apparatus to move freely.

Further, it is advantageous that the hollow connecting stud telescopes with a cylindrical, hollow adjustment piece at a driving end thereof because the combined length of this adjusting mechanism can be easily, economically, and quickly adjusted to a length that is necessary to accommodate the governor positioning drive and tolerances of the adjusting mechanism. This dimension is for the most part determined by the idle position of a throttle with which the adjusting mechanism is coupled.

Because the hollow adjustment piece 4 has an adjustment-piece cap with an opening therein on its driving end, and because a portion of the coupling rod 7 slidably rides in the opening, the benefit is available that the coupling rod is free to move in the cavity of the hollow connecting stud and the hollow adjustment piece, thereby providing a decoupling between the governor positioning drive and the speed adjustment apparatus. This mechanism also saves space.

It is also beneficial that the coupling rod 7 has an enlargement at its driven end that is larger than the opening in which the coupling rod rides because in this manner the coupling rod can be simply and economically coupled to the governor positioning drive when the governor is to be placed in operation since the idling position of the adjusting mechanism is adjusted so that the enlargement of the coupling rod engages with the adjustment-piece cap 5 at the opening 6. Also, it is at any time possible when the governor is in operation to manually accelerate because the coupling rod 7 is automatically decoupled in the direction of the governor positioning drive for free movement in this direction.

It is also beneficial that the coupling rod 7 has a connecting apparatus at its driving end which allows the coupling rod to be connected to the speed adjustment apparatus 100 through a simple and inexpensive mounting.

It is particularly beneficial that the adjusting mechanism includes the opposite groups of sawtooth like ribs on the inside of the hollow adjustment piece and the outside of the hollow connecting stud which extend over a set distance parallel to one another in a direction parallel to the axis. These groups of ribs are arranged such that the hollow adjustment piece can be moved relative to the hollow connecting stud in the axial direction but yet a relative radial twisting between the hollow adjustment piece 4 and the hollow connecting stud 1 causes meshing of these ribs to provide a uncomplicated and economical manner, without expenditure of undue force in the axial direction for setting the adjustment mechanism to a length corresponding to the idle position.

In this regard, it is further beneficial that the respective opposite groups ribs on the hollow connecting stud as well as in the hollow adjustment piece are axially offset from one another. An offset distance of one half rib spacing is particularly beneficial, because in this manner, a finer and more exact adjustment can be reached. Also, such an arrangement allows the ribs to be constructed with greater spacing and thereby reduces production costs while still allowing fine adjustments.

Because the resilient ribs of the hollow adjustment piece or the hollow connecting stud have at least one axially extending groove while the other member has at least one axially-extending ridge (which could also be resilient) over a plurality of ribs, the width of the ridge being approximately the same as that of the groove, a uncomplicated and inexpensive manner is provided for fixing the position of the hollow adjustment piece 4 relative to the hollow connecting stud 1 so as to prevent an undesirable rotation and decoupling. This increases the reliability of the coupling apparatus of this invention. Because the coupling rod, the hollow adjustment piece and the hollow connecting stud are injection molded of resinous plastic, construction of these parts is uncomplicated and inexpensive.

The embodiments of the invention in which an exclusive property or privilege are claimed are defined as follows:

1. A coupling apparatus for a motor throttle of a type including pieces that are movable relative to one another but which can be more rigidly engaged with one another for coupling a governor positioning drive of a governor with a speed adjusting apparatus of a throttle, said coupling apparatus comprising:

an adjustment mechanism including a cylindrically formed, elongated, hollow connecting stud connected to the governor positioning drive at a driven end portion and a cylindrically formed, hollow, adjustment piece telescoped to the connecting stud at an opposite driving end portion, the adjustment piece including a cap for covering a hollow cavity of the adjustment piece with a cap opening therein;

a coupling rod slidably extending through the opening in the adjustment-piece cap, a driven end of the coupling rod directed toward the governor positioning drive having an enlargement thereon that is larger than that portion of the cap opening in which the coupling rod is positioned, a driving end of the coupling rod directed away from the governor positioning drive including a connecting apparatus for coupling the coupling rod with the speed adjustment apparatus.

2. A coupling apparatus as in claim 1, wherein the adjustment mechanism comprises oppositely positioned, groups of radially-extending tooth-like ribs on an inside surface and oppositely positioned, groups of radially-extending tooth-like ribs on an outside surface of the telescoped hollow connecting stud and the hollow adjustment piece, the ribs of each group of radially-extending tooth-like ribs being arranged parallel to an axial direction so that the hollow adjustment piece is free to be moved in the axial direction but a circumferential rotation between the hollow adjustment piece and the hollow connecting rod causes the ribs of the groups of ribs to mesh with one another to inhibit further such axial movement.

3. A coupling apparatus as in claim 2, wherein the ribs in each group have fixed regular axial spacings, the fixed spacings being the same for all groups and wherein the ribs of the respective oppositely positioned groups on each of said inside and outside surfaces being axially displaced from one another by one half of the fixed spacing.

4. A coupling apparatus as in claim 2, wherein one of the groups of ribs on the inside or outside surfaces defines a slot running parallel to the axial direction while the ribs in the other of said inside or outside surface includes a ridge running parallel to the axial direction, the ridge having a width approximately corresponding to the width of the slot.

5. A coupling apparatus as in claim 1, wherein the governor positioning drive is affixed to a vehicle chassis or motor block.

6. A coupling apparatus as in claim 1, wherein the hollow connecting stud is connect to the governor positioning drive via a fastening apparatus, the fastening apparatus comprising a restriction on the inside surface of the hollow connecting stud and a resilient, outwardly biased fastening part on the governor positioning drive which extends into the hollow connecting stud and engages shoulders forming the restriction.

7. A coupling apparatus as in claim 1, wherein the opening in the adjustment piece cap has a key hole shape whose first portion is a large size for receiving the drive end enlargement of the coupling rod, whose second portion has a gradually smaller size to become smaller than a main, central, portion of said coupling rod, and whose third portion, through which the main, central, portion of the coupling rod slidably extends, is arranged in a central portion of the adjustment-piece cap.

8. A coupling apparatus as in claim 1, wherein the drive end enlargement of the coupling rod has a substantially spherical shape.

9. A coupling apparatus as in claim 1, wherein the connecting apparatus at the opposite end of the coupling rod from the enlargement includes a ball socket with resilient fastening parts for receiving a ball.

10. A coupling apparatus as in claim 1, wherein the connecting apparatus of the coupling rod is linked to a gas pedal lever, the gas pedal forming part of the speed adjustment apparatus.

11. A coupling apparatus as in claim 1, wherein the governor positioning drive includes a pneumatic motor that comprises a main body, a membrane, a spring, and a movable plate attached to the membrane.

12. A coupling apparatus as in claim 1, wherein the coupling rod, the hollow adjustment piece, and the hollow connecting stud are formed from injection molded resinous plastic.

13. A coupling apparatus as in claim 1, wherein the hollow adjustment piece and the cap are molded as a single piece.

14. A coupling apparatus as in claim 6, wherein the hollow connecting stud presses on the membrane of the governor positioning drive via the fastening part, which is molded as one piece with the plate.

* * * * *